United States Patent [19]

Lautenschläger et al.

[11] Patent Number: 6,096,670
[45] Date of Patent: Aug. 1, 2000

[54] ALKALI METAL-FREE ALUMINOBOROSILICATE GLASS AND ITS USE

[75] Inventors: Gerhard Lautenschläger, Jena; Klaus Schneider, Apolda; Thomas Kloss, Jena; Peter Brix, Mainz, all of Germany

[73] Assignee: Schott Glaswerke, Mainz, Germany

[21] Appl. No.: 09/151,726

[22] Filed: Sep. 11, 1998

[30] Foreign Application Priority Data

Sep. 11, 1997 [DE] Germany .......................... 197 39 912

[51] Int. Cl.$^7$ .................................................. C03C 3/093
[52] U.S. Cl. ................ 501/67; 501/64; 501/70; 428/426
[58] Field of Search .................. 501/64, 67, 70; 428/426

[56] References Cited

U.S. PATENT DOCUMENTS

| 5,116,789 | 5/1992 | Dumbaugh, Jr. et al. . |
| 5,506,180 | 4/1996 | Ponthieu . |
| 5,508,237 | 4/1996 | Moffatt et al. . |
| 5,770,535 | 6/1998 | Brix et al. . |
| 5,811,361 | 9/1998 | Miwa . |
| 5,851,939 | 12/1998 | Miwa ........................................ 501/67 |
| 5,908,703 | 6/1999 | Brix et al. ................................ 501/67 |

FOREIGN PATENT DOCUMENTS

| 0 510 544 | 10/1992 | European Pat. Off. . |
| 0 527 320 | 2/1993 | European Pat. Off. . |
| 0 672 629 | 9/1995 | European Pat. Off. . |
| 0 714 862 | 6/1996 | European Pat. Off. . |
| 0 787 693 | 8/1997 | European Pat. Off. . |
| 196 01 922 | 7/1997 | Germany . |
| 196 17 344 | 8/1997 | Germany . |
| 08295530 | 11/1996 | Japan . |
| 09048632 | 2/1997 | Japan . |
| 10072237 | 3/1998 | Japan . |

OTHER PUBLICATIONS

English Abstract of JP 8295530 A, Shinkichi, Nov. 12, 1996.
English Abstract of DE 3808573, Beeker et al, Dec. 1988.
English Abstract of WO 9711920, Miwa, Apr. 1997.
English Abstract of DE 196 17 344, Brix et al, Apr. 1996.
English Abstract of EP 510544, Kushitani et al, Dec. 1992.
English Abstract of EP 714 862, Nishizawa et al, Jun. 1996.

*Primary Examiner*—Karl Group
*Attorney, Agent, or Firm*—Millen, White, Zelane, & Branigan, P.C.

[57] ABSTRACT

An alkali metal-free aluminoborosilicate glass is described which has the following composition (in % by weight based on oxide):

$SiO_2$ 57–60; $B_2O_3$ 6.5–9.5; $Al_2O_3$ 14–17.5; MgO 5–8; CaO 1–4; SrO 5–8; BaO 0–3.5; with MgO+CaO+SrO+BaO 15–17; $ZrO_2$ 0.4–1.5; $TiO_2$ 0.4–1.5; $CeO_2$ 0.1–0.5; $SnO_2$ 0.2–1.

The glass is particularly suitable for use as a substrate glass in display technology.

11 Claims, No Drawings

ALKALI METAL-FREE ALUMINOBOROSILICATE GLASS AND ITS USE

The invention relates to an alkali metal-free aluminoborosilicate glass for use in display technology.

The requirements made on a glass which is to be used in display technology, for example as the front screen for a flat-panel display, have been explicitly described by W. H. Dumbaugh, P. L. Bocko and F. P Fehlner ("Glasses for flat-panel displays" in "High-Performance Glasses", ed. M. Cable and J. M. Parker, Blackie and Son Limited, Glasgow and London, 1992). The glasses available at the time for applications of this type have also been reviewed in the article "Advanced glass substrates for flat panel displays" by J. C. Lapp, P. L.. Bocko and J. W. Nelson, Corning Research 1994. The quality of the properties which are needed for flat glass substrates and have a decisive effect on the precision of the imaging properties of a system, is dictated on the one hand directly by the composition of the glass and, on the other hand, from the production, processing and shaping method and the facility thereof to set particular properties for the glasses, for example thickness profile parameters and planarity parameters, the applicability of the method being frequently limited in turn by the composition of the glass or by properties of the glass.

Borosilicate glasses play a dominant role in a large number of technically oriented glass applications. In particular, they are distinguished by high stability when presented with cyclic and differential thermal loads, by low thermal expansion and by good resistance to corrosive reagents and media.

Borosilicate glasses are therefore in principle also of interest for use as substrate glass in display technology, but the display production process, for example for active matrix liquid displays (AMLCDs), and the desired application require a quite special property profile of the glasses;

- a coefficient of thermal expansion tailored to polycrystalline silicon $\alpha_{20/300}=3.5–3.8\times10^{-6}/K$,
- a temperature at the viscosity $10^{14.5}$ dPas of at least 650° C. in order to ensure high thermal processing and geometrical stability of the glass during production, in particular low compaction of the glass in the cooling phase,
- a glass composition free of alkali metals, a maximum alkali metal oxide content of $\Sigma R_2O=1000$ ppm being tolerable in order to avoid poisoning the microstructured thin-film transistors by the alkali metal ions diffusing into the semiconductor layer,
- sufficient chemical, i.e., hydrolytic, acid and alkali resistance, with respect to the reagents and media used in the microstructuring process,
- a relatively low density, i.e., $\rho \leq 2.60$ g/cm$^3$, in order, in particular, in the case of large screen formats, to keep the overall weight of the display low.

Furthermore, the visual quality of the glass screens, that is to say the quality in terms of the absence of crystalline inclusions, knots and bubbles, must be very good.

This complex and extensive requirement profile is fulfilled best by borosilicate glasses from the alkaline-earth metal aluminoborosilicate glass subfamily. The known commercially available glasses for TFT AMLCD applications belong to this type of glass; the glasses in the patents or patent applications discussed below are also representatives of this group. However, all currently known glasses for display applications still have disadvantages and do not meet the full list of requirements:

BACKGROUND OF THE INVENTION

U.S. Pat. No. 5,506,180 describes thermally stable and chemically resistant glasses, amongst other things for use as TFT display glass. On account of the high $B_2O_3$ contents of 10% or more and the relatively low $SiO_2$ levels (46–56%), glasses of this type are not sufficiently resistant to hydrochloric acid. Furthermore, their resistance to solutions containing hydrofluoric acid is only moderate. The matching of the thermal expansion to polycrystalline silicon is insufficient. The processing temperatures $V_A$ of less than 1150° C. are too low to make it possible to use drawing methods such as the microsheet down-draw method and the overflow fusion method as alternatives to the float process. Furthermore, the specified strain points of 642° C. or less are too low to ensure that there is little compaction.

European Patent EP 510 544 B1 describes alkali metal-free glass which can be made in the float process and, amongst other things, are used as a substrate for a variety of displays and photographic masks. The glasses are free of BaO and MgO and have only low levels of $B_2O_3$. At 4.5–6.0 $\times10^{-6}$/K, their thermal expansion is no longer sufficient to meet the requirements of high-quality TFT display glasses which are very well-tailored to polycrystalline silicon.

Patent EP 527 320 B1 describes flat display devices having a strontium aluminosilicate glass substrate. The glass compositions for glasses with high devitrification stability appear to be geared especially to the suitability for being made in the overflow fusion draw method. The density of the glasses and their coefficient of thermal expansion are too high.

Japanese JP 8-295530 A describes alkali metal-free glass substrates whose stability with respect to hydrochloric acid is lowered because of the high $B_2O_3$ content, (up to 15% by weight).

PCT Applications WO 97/11919 and WO 97/11920 also describe alkali metal-free glass substrates. They are free of or low in MgO. They may respectively contain up to 5% by weight of ZnO and $TiO_2$. ZnO can cause glass defects owing to its inclination to evaporate from the glass surface in the float bath and subsequently condense. The possibly high $TiO_2$ content will cause a brown tint in the glasses when conventional raw materials are used, since the $Fe^{3+}$ always present in the usual raw materials forms a brown color complex with $Ti^{4+}$.

European Patent Application EP 714 862 A1 describes alkali metal-free glasses for use in TFT flat displays. The illustrative embodiments exhibit very good display characteristics, for example in terms of thermal expansion, strain point or HCl stability. However, the viscous behavior of the glasses is unfavorable for the allegedly suitable production process of "floating" as evinced by the fixed-point temperatures T (log $\eta$=4)=1310–1350° C. and T (log $\eta$=2)=1710–1810° C. which have a decisive technical effect on the floating as well as melting and refining methods, and are too high. For highly viscous aluminosilicate glasses of this type with high $SiO_2$ contents, efficient refining is extremely problematic. The glasses do not therefore meet the requisite high demands in terms of visual quality.

EP 672 629 A2 or U.S. Pat. No. 5,508,237 describe aluminosilicate glasses for flat displays. They present a variety of composition ranges with different coefficients of thermal expansion. These glasses are allegedly processable not only with the overflow fusion draw method but also with other flat glass production methods. However, in particular the glasses which have a coefficient of thermal expansion tailored to polycrystalline Si have very high processing temperatures $V_A$, which make them unsuitable for the float process. As in the case of the glasses described above, the visual quality is here again not high, since no way of effective refining, in particular one compatible with the float process, is presented. The refining agents $Sb_2O_3$ and $As_2O_3$ mentioned by way of example are unsuitable for the float process because they can be reduced readily. The same is true for the optional glass components $Ta_2O_5$ and $Nb_2O_5$.

In the alkali metal-free glass substrates for TFT AMLCD from JP 9-48632 A as well, the visual quality will not be high, since merely $SiO_2$, $B_2O_3$, MgO and BaO are to be present in the glass.

German Patent DE 38 08 573 C2 describes alkali metal-free aluminosilicate glasses which contain $SnO_2$, are easy to melt and can be refined economically. The glasses exhibit high chemical stability. They are used as photographic mask glass. At $4.0 \times 10^{-6}$/K, their thermal expansion behavior is not optimally tailored to that of polycrystalline silicon. On account of the fact that they are free of $B_2O_3$ and at the same time have high $Al_2O_3$ content, the glasses have a temperature/viscosity profile which is unfavorable for flat glass production processes.

German Patent DE 196 17 344 C1 in the name of the applicant company also describes alkali metal-free glasses which contain $SnO_2$. The glasses have a relatively low $SiO_2$ level and a high $Al_2O_3$ content. With a coefficient of thermal expansion of about $3.7 \times 10^{-6}$/K and very good chemical stability, these glasses are suitable for use in display technology. There is, however, still a need for improvement in terms of making them economically with the float as well as the draw method, that is to say in terms of being "universally" manufacturable. This is also true as regards glasses from German Patent DE 196 036 98 C1 in the name of the applicant company.

SUMMARY OF THE INVENTION

An object of the invention is to provide glasses which meet the said physical and chemical requirement of modern TFT display glass substrates, glasses which have a favorable processing temperature range and high devitrification stability, so that a variety of flat glass manufacturing method, such as the float method or draw method (up-draw and various down-draw methods) can be employed for producing them, depending on the specific application profile for the various TFT display types. The thicknesses which can be produced therefore also vary in the range between 30 μm and a few, e.g. 2, mm. Glasses of this type need to be readily meltable and refinable, and should therefore have relatively low temperatures at the viscosity $10^{2.0}$ dpas, i.e. temperatures of 1600–1630° C.

Upon further study of the specification and appended claims, further objects and advantages of this invention will become apparent to those skilled in the art.

The formation of highly volatile borate compounds such as zinc borate, lead borate and barium aluminoborate, which can impair the internal glass quality, should be avoided or at least minimized.

In order to produce microsheets in the thickness range between 30 and 50 μm using the microsheet down-draw method (MDD method), the glasses should at the same time have very high devitrification stability and specific processing temperatures $V_A$.

Suitable processing temperatures are temperatures at the viscosity $10^4$ dPas of 1230 to 1260° C. One characteristic for the devitrification stability or crystallization stability is the maximum crystal growth rate $v_{MAX}$ [μm/h]. It indicates the largest observed growth length of the crystals which are formed on a plot of the growth rate v of the crystals against temperature T, $v_{MAX}$ corresponds to the growth rate at the temperature of maximum crystal growth, at $KG_{MAX}$. The smaller $v_{MAX}$ is, the less crystalline volume is formed. This $v_{MAX}$ should in this case be no more than 10 μm/h.

In order to produce glass panels for display applications using the microfloat method, in particular in large formats, the temperature at $10^4$ dPas viscosity should be between 1230 and 1280° C. Readily reducible glass components such as $As_2O_3$, $Sb_2O_3$, $P_2O_5$, $Bi_2O_3$, PbO, CdO and ZnO should not be contained in the glass composition, because they can be reduced to the elementary state under the reducing conditions in the float bath, and can produce a grey metallic surface reflection or other microsurface defects. The requirements of crystallization stability are not as high here as in the aforementioned MDD method. A $v_{MAX}$ of less than or equal to 30 μm/h is therefore still sufficient.

For the production of very flat thin glass panels with thicknesses of between 0.5 and 1.1 mm in the overflow fusion method, which is a down-draw method, the glass should have specifically high devitrification stability, i.e. a $v_{MAX}$ of at most 10 μm/h, and preferably even only at most 5 μm/h, and an upper devitrification limit, or liquidus temperature ($T_{liquidus}$), that is to say the temperature at which crystals that may have been formed will be redissolved, which is as far as possible below the processing temperature $V_A$. $V_A$ should in this case be between 1240 and 1320° C. According to the prior art, $V_A$ is rather high for glasses of this type, in order to achieve a large difference $V_A$-$T_{liquidus}$. However, this is disadvantageous since a high processing temperature increases the primary energy costs in glass production, and prompts corrosion of the refractories. A low liquidus temperature is therefore desirable.

Regardless of the methods described here, $V_A$ should as far as possible not exceed 1280° C.

The aforementioned objects are achieved by a glass as described below.

According to the invention, the three glass-forming components $SiO_2$, $B_2O_3$ and $Al_2O_3$ are present in a narrowly defined content, and thus within a narrow ratio relative to one another as well. The $SiO_2$ level is relatively high, specifically at least 57% by weight, but at most 60% by weight. The $B_2O_3$ content is rather low and is at least 6.5% by weight and at most 9.5% by weight. Limitation to less than 9% by weight is preferred. The $Al_2O_3$ content should merely vary between 14 and 17.5, preferably between 14 and 17% by weight. Only in this way is it possible to achieve the desired low coefficients of thermal expansion $\alpha_{20/300}$ in the range of from 3.5 to $3.8 \times 10^{-6}$/K with at the same time a low density ρ of at most 2.6 g/cm³. On account of the mutual influence of $B_2O_3$ and $Al_2O_3$ in the glass structure, the desired good chemical and crystallization stability can only be achieved in the aforementioned narrow range of $B_2O_3$ content. Lower $B_2O_3$ contents make the glass more susceptible to devitrification and increases the thermal expansion by directly affecting the Al coordination with the number of aluminum atoms with coordination numbers 5 and 6 increasing. If the $B_2O_3$ and $Al_2O_3$ content is too high, the resistance to hydrochloric acid is reduced.

Alkaline-earth metal oxides are present in the glass at a total of at least 15% by weight. At a lower level, the temperatures at the viscosities required for melting and shaping would be too high. A balanced ratio between small cations and large cations of the alkaline-earth metal oxides, with the proviso that the number of small cations should be predominant, has a positive effect on the processing temperature. The glass therefore contains 5–8% by weight of MgO and 0–3.5% by weight of BaO, the presence of 2–3.5% by weight of BaO being preferred, and 1–4% by weight of CaO and 5–8% by weight of SrO The total level of MgO, CaO, SrO and BaO should in this case remain restricted to 17% by weight, since otherwise the chemical resistance again decreases.

The use of SrO is preferred over BaO in order to keep the density of the glasses low. If the heavy oxides BaO and SrO were fully eliminated, or if their level were too low, then the glass would become more susceptible to devitrification and the transformation temperature as well as the temperature at viscosity $10^{14.5}$ dPas would decrease. At excessively high levels of BaO and SrO, the processing temperature would become unacceptably high.

Glasses which are free of BaO and glasses which are low in BaO are preferably processed using the float method, while glasses containing a high level of BaO are preferably processed using the draw method.

Apart from unavoidable impurities, the glass is free of ZnO and alkali metal oxides.

The glass furthermore contains 0.4–1.5% by weight of $ZrO_2$. $ZrO_2$ improves chemical resistance. Its maximum content is limited by its low solubility. The glass also contains 0.4–1% by weight of $TiO_2$. This minimizes the otherwise often observed susceptibility of aluminoborosilicate glasses to solarization, that is to say reduction in transmission in visible wavelengths because of UV-VIS radiation.

The combination of $TiO_2$ with $SnO_2$, which is present in the glass in $SnO_2/SnO$ redox equilibrium, is particularly effective in this case. By virtue of the presence of 0.2–1% by weight, calculated and introduced as $SnO_2$, the $Fe^{3+}$ ions, which are unavoidable when customary raw materials are used, are reduced. This avoids the occurrence, otherwise commonplace with glasses containing $TiO_2$, of the yellow coloration which impairs transmission and is due to a Ti complex containing $Fe^{3+}$. Glasses are thus obtained which, when used as substrate glasses for display devices, ensure that the image will be very bright even after relatively long use.

Besides the aforementioned $SnO_2$ content, the presence of 0.1–0.5% by weight of $CeO_2$ is essential to the invention.

By the combination of $SnO_2$ with $CeO_2$, the $SnO_2/SnO$ redox equilibrium is stabilized and an extraordinarily good refining effect is achieved for aluminoborosilicate glasses, so that the glasses according to the invention exhibit the requisite high visual quality. Furthermore, $SnO_2$ and $CeO_2$ in combination with $ZrO_2$ stabilize the $SnO_2$ and $CeO_2$ in combination with $ZrO_2$ stabilize the chemical resistance of the glasses. At higher $CeO_2$ contents, the UV-absorption increases and the absorption cut-off shifts into the VIS range.

Amongst other things, because it is thus possible to eliminate the use of the refining agents $As_2O_3$ and $Sb_2O_3$, and the glasses are, apart from unavoidable impurities, free both of these components and of other readily reducible constituents, these glasses can be processed not only using a variety of draw methods, but also using the float method. Should the latter method not be employed, then the glass may contain up to 1.5% by weight of $As_2O_3$ and/or $Sb_2O_3$ as additional refining agent(s). It is also possible to add 1.5% by weight each of $Cl^-$ (for example in the form of $BaCl_2$), $F^-$ (for example in the form of $CaF_2$) or $SO_4^{2-}$ (for example in the form of $BaSO_4$). The sum of $As_2O_3$, $Sb_2O_3$, $Cl^-$, $F^-$ and $SO_4^{2-}$ should, however, not exceed 1.5% by weight.

The entire disclosure of all applications, patents and publications, cited above and below, and of corresponding German Application No. 197 39 912.6, filed Sep. 11, 1997 is hereby incorporated by reference.

In the foregoing and in the following examples, all temperatures are set forth uncorrected in degrees Celsius; and, unless otherwise indicated, all parts and percentages are by weight.

EXAMPLES

Glasses were melted in $SiO_2$ crucibles from conventional raw materials at 1620° C., the melt was refined for one and a half hours at this temperature, then poured into inductively heated platinum crucibles and stirred for 30 minutes at 1550° C. to homogenize them.

The tables show glasses according to the invention with their compositions and their most important properties in examples 1 to 5 (Table 1), and the glasses not according to the invention in comparative examples A to J (Table 2). The various chemical resistances are given as follows: Glass plates measuring 70 mm×50 mm×2 mm and polished on all sides were treated for the indicated period of time at the indicated temperature with the respective solutions and the weight loss (erosion) was determined and indicated in mg/cm².

$H_2O$ Treatment with water for 24 hours at 95° C.
HCl Treatment with 5% strength hydrochloric acid for 24 hours at 95° C.
NaOH Treatment with 5% strength soda lye for 6 hours at 95° C.
"BHF" Treatment with 10% strength hydrofluoric acid solution for 20 minutes at 20° C.

The characteristics indicated for the susceptibility to crystallization (susceptibility to devitrification), or relevant stability are the liquidus temperature and the maximum crystal growth rate $v_{MAX}$.

The temperature for viscosities $10^{14.5}$ dpas, $10^{13}$ dpas, $10^{7.6}$ dpas, $10^4$ dPas and $10^2$ dPas are denoted in the Tables by T 14.5; T 13; T 7.6; T 4 and T 2.

The further properties of the glasses which are indicated are the transformation temperature Tg, coefficient of thermal expansion $\alpha^{20/300}$ $[10^{-6}/K]$ and density $\rho[g/cm^3]$.

TABLE 1

Examples: Compositions (in % by weight based on oxide) and essential properties of glasses according to the invention.

|  | 1 | 2 | 3 | 4 | 5 |
|---|---|---|---|---|---|
| $SiO_2$ | 57.0 | 58.8 | 58.6 | 59.0 | 59.5 |
| $B_2O_3$ | 8.0 | 8.5 | 8.5 | 8.0 | 7.5 |
| $Al_2O_3$ | 17.0 | 15.0 | 15.0 | 15.0 | 15.0 |
| MgO | 5.0 | 6.0 | 6.0 | 6.0 | 6.0 |
| CaO | 2.0 | 2.0 | 2.0 | 2.0 | 2.0 |
| BaO | 3.3 | 2.0 | 2.0 | 2.3 | 2.3 |
| SrO | 6.0 | 6.0 | 6.0 | 6.0 | 6.0 |
| $ZrO_2$ | 0.5 | 0.5 | 0.5 | 0.5 | 0.5 |
| $SnO_2$ | 0.5 | 0.5 | 0.5 | 0.5 | 0.5 |
| $TiO_2$ | 0.5 | 0.4 | 0.4 | 0.5 | 0.5 |
| $CeO_2$ | 0.2 | 0.5 | 0.5 | 0.2 | 0.2 |
| $\rho$ [g/cm³] | 2.56 | 2.54 | 2.53 | 2.54 | 2.55 |
| $\alpha_{20/300}$ $[10^{-6}/K]$ | 3.7 | 3.7 | 3.7 | 3.7 | 3.7 |
| Tg [° C.] | 715 | 704 | 702 | 708 | 715 |
| T 2 [° C.] | 1605 | 1603 | 1601 | 1610 | 1612 |
| T 4 [° C.] | 1254 | 1244 | 1245 | 1252 | 1256 |
| T 7.6 [° C.] | 939 | 929 | 938 | 936 | 939 |
| T 13 [° C.] | 724 | 716 | 725 | 724 | 722 |
| T 14.5 [° C.] | 667 | 663 | 667 | 666 | 665 |
| $T_{liquidus}$ [° C.] | 1150 | 1210 | 1230 | 1210 | 1160 |

TABLE 1-continued

Examples: Compositions (in % by weight based on oxide) and essential properties of glasses according to the invention.

|  | 1 | 2 | 3 | 4 | 5 |
|---|---|---|---|---|---|
| $V_{MAX}$ [μm/h] | 4.5 | 8.8 | 10.0 | 7.3 | 8.9 |
| $H_2O$ [mg/cm$^2$] | 0.02 | 0.02 | 0.02 | 0.01 | 0.01 |
| Hcl [mg/cm$^2$] | 1.0 | 0.9 | 1.0 | 0.8 | 0.6 |
| NaOH [mg/cm$^2$] | 1.0 | 1.0 | 1.0 | 1.0 | 0.7 |
| "BHF" [mg/cm$^2$] | 0.7 | 0.6 | 0.6 | 0.6 | 0.6 |

TABLE 2

Comparative examples: Compositions (in % by weight based on oxide) and essential properties of glasses not according to the invention.

|  | A | B | C | D | E | F | G | H | I | J |
|---|---|---|---|---|---|---|---|---|---|---|
| $SiO_2$ | 57.0 | 55.8 | 59.0 | 59.5 | 59.5 | 59.5 | 59.5 | 58.0 | 59.8 | 58.8 |
| $B_2O_3$ | 5.0 | 10.0 | 5.0 | 5.0 | 5.0 | 5.0 | 5.0 | 4.0 | 9.3 | 8.0 |
| $Al_2O_3$ | 18.0 | 18.0 | 15.0 | 15.0 | 15.0 | 15.0 | 15.0 | 18.0 | 14.5 | 15.0 |
| MgO | 8.0 | 5.0 | 2.0 | 10.0 | 5.0 | 5.0 | 6.0 | 6.0 | 2.0 | 7.5 |
| CaO | 2.0 | 2.0 | 10.0 | 2.0 | 7.0 | 7.0 | 8.0 | 8.0 | 2.0 | 8.5 |
| BaO | 6.0 | 2.0 | 5.0 | 1.0 | 1.0 | 3.0 | 2.0 | 2.0 | 7.0 | — |
| SrO | 3.0 | 6.0 | 3.0 | 5.5 | 5.5 | 3.5 | 2.5 | 2.0 | 4.0 | — |
| $ZrO_2$ | — | 0.5 | — | 1.0 | 1.0 | 1.0 | 1.0 | 1.0 | 0.5 | 1.0 |
| $SnO_2$ | 1.0 | 0.5 | 1.0 | 1.0 | 1.0 | 1.0 | 1.0 | 1.0 | 0.2 | 1.0 |
| $TiO_2$ | — | — | — | — | — | — | — | — | 0.5 | — |
| $CeO_2$ | — | 0.2 | — | — | — | — | — | — | 0.2 | 0.2 |
| ρ [g/cm$^3$] | 2.61 | 2.54 | 2.61 | 2.59 | 2.59 | 2.59 | 2.58 | 2.60 | 2.53 | 2.53 |
| $α_{200/300}$ [10$^{-6}$/K] | 4.0 | 3.6 | 4.5 | 4.0 | 4.2 | 4.2 | 4.1 | 4.1 | 3.6 | 3.8 |
| Tg [° C.] | 738 | 717 | 726 | 736 | 722 | 724 | 727 | 735 | 704 | 690 |
| T 2 [° C.] |  |  |  |  |  |  |  | >1700 |  |  |
| T 4 [° C.] |  | 1254 |  |  | 1230 | 1234 | 1215 | 1224 | 1316 | 1204 |
| T 7.6 [° C.] |  | 942 |  |  |  |  | 915 | 921 | 959 | 901 |
| T 13 [° C.] |  | 729 |  |  |  |  | 716 | 710 | 714 | 698 |
| T 14.5 [° C.] |  | 670 |  |  |  |  | 665 | 661 | 660 | 645 |
| $T_{liquidus}$ [° C.] | >1250 | 1150 | >1250 | >1250 | >1250 | >1250 | >1250 | >1250 | 1150 | 1240 |
| $V_{MAX}$ [m/h] | 51 | 4.4 | 28 | 40 | 28 | 35 | 50 | 62 | 4.4 | 16 |
| $H_2O$ [mg/cm$^2$] | 0.02 | 0.02 | 0.02 | 0.02 | 0.02 | 0.02 | 0.02 | 0.02 | 0.01 | 0.02 |
| HCl [mg/cm$^2$] | 0.3 | 2.3 | 0.2 | 0.2 | 0.2 | 0.2 | 0.2 | 0.1 | 0.4 | 0.9 |
| NaOH [mg/cm$^2$] | 0.6 | 1.1 | 0.7 | 0.7 | 0.7 | 0.7 | 0.6 | 0.5 | 1.2 | 1.0 |
| "BHF" [mg/cm$^2$] | 0.1 | 0.7 | 0.1 | 0.1 | 0.1 | 0.1 | 0.1 | 0.1 | 0.5 | 0.6 |

The glasses from the comparative examples respectively have some very good individual properties as well, but unlike the glasses according to the invention, none of the comparison glasses meets the entire requirement profile of a display substrate glass for TFT applications: $B_2O_3$ levels which are too low reduce the devitrification stability and increase the thermal expansion (examples A, C–H). Too high a $B_2O_3$ and $Al_2O_3$ content reduces the resistance to hydrochloric acid (example B). Example I and Example J illustrate the need for a balanced ratio of small alkaline-earth metal ions to large ones: with a "correct" total amount of alkaline-earth metal oxides, but too little MgO and too much BaO (example I), the processing temperature is very high, and especially is too high for float processing. If there is a lack of both BaO and SrO (example J), $V_{MAX}$ is very high and the liquidus temperature is above the processing temperature.

Conversely, the glasses according to the invention, with a narrowly defined composition range, combine together all the properties which have been discussed:

Their coefficient of thermal expansion $α_{20/300}$ is very well matched to polycrystalline silicon.

Their density is very low.

Their chemical resistances are outstanding.

They have sufficient solarization stability.

They have favorable processing temperatures ($V_A \leq 1280°$ C.).

The temperature at viscosity $10^{14.5}$ dPas is at least 650° C.

The glasses are free of alkali metal.

The glasses have very good crystallization stability.

Because of their temperature/viscosity profile and their low susceptibility to crystallization, the glasses may, as long as they are free of readily reducible constituents, be processed both using the various draw methods and using the float method. It should however, be understood that, because of its quite special property profile, one specific glass from the composition range according to the invention is even more suitable for one method than for another. It is straightforward for the person skilled in the art, on the basis of the indications given here, to select the glass which is optimum for the relevant application and special needs.

Because of their balanced combination of constituents, in particular refining agents, the glasses have very good visual quality.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An alkali metal-free aluminoborosilicate glass, which has the following composition in % by weight based on oxide:

| $SiO_2$ | 57–60 |
|---|---|
| $B_2O_3$ | 6.5–9.5 |
| $Al_2O_3$ | 14–17.5 |
| MgO | 5–8 |

-continued

| | |
|---|---|
| CaO | 1–4 |
| SrO | 5–8 |
| BaO | 0–3.5 |
| with MgO + CaO + SrO + BaO | 15–17 |
| $ZrO_2$ | 0.4–1.5 |
| $TiO_2$ | 0.4–1 |
| $CeO_2$ | 0.1–0.5 |
| $SnO_2$ | 0.2–1. |

2. The aluminoborosilicate glass according to claim 1, which is capable of being produced on a float system, and which is essentially free of arsenic oxide and antimony oxide.

3. The aluminoborosilicate glass according to claim 1, which further contains in % by weight based on oxide:

| | |
|---|---|
| $As_2O_3$ | 0–1.5 |
| $Sb_2O_3$ | 0–1.5 |
| $Cl^-$ | 0–1.5 |
| $F^-$ | 0–1.5 |
| $SO_4^{2-}$ | 0–1.5 | with $As_2O_3 + Sb_2O_3 + Cl^- + F^- + SO_4^{2-} \leq 1.5$.

4. The aluminoborosilicate glass according to claim 1, which has a coefficient of thermal expansion, $\alpha_{20/300}$, of from 3.5 to $3.8 \times 10^{-6}$/K, a temperature at the viscosity $10^{14.5}$ dPas of at least 650° C., a temperature at the viscosity $10^4$ dPas of $\leq 1280°$ C., a density $\rho$ of at most 2.60 g/cm³ and a weight loss of at most 1.0 mg/cm² after 24 hours of treatment in 5% strength hydrochloric acid at 95° C.

5. The aluminoborosilicate glass according to claim 3, which has a coefficient of thermal expansion, $\alpha_{20/300}$, of from 3.5 to $3.8 \times 10^{-6}$/K, a temperature at the viscosity $10^{14.5}$ dPas of at least 650° C., a temperature at the viscosity $10^4$ dPas of $\leq 1280°$ C., a density $\rho$ of at most 2.60 g/cm³ and a weight loss of at most 1.0 mg/cm² after 24 hours of treatment in 5% strength hydrochloric acid at 95° C.

6. The aluminoborosilicate glass of claim 1, which has a temperature at viscosity of $10^4$ dpas of 1230 to 1260° C. and a $v_{MAX}$ of no more than 10 μm/h.

7. The aluminoborosilicate glass of claim 2, which is further essentially free of $P_2O_5$, $Bi_2O_3$, PbO, CdO and ZnO, has a temperature at $10^4$ dpas viscosity of 1230 to 1280° C. and has a $v_{MAX}$ less than or equal to 30 μm/h.

8. The aluminoborosilicate glass of claim 1, which has a $v_{MAX}$ of at most 5 μm/h, a processing temperature $V_A$ from 1240 to 1320° C.

9. A display glass substrate composed of an aluminoborosilicate glass of claim 1.

10. The display glass substrate of claim 9 which has a thickness of 30 μm to 2 mm.

11. A display glass substrate of claim 9 which is a TFT display glass substrate.

* * * * *